United States Patent

[11] 3,626,842

[72] Inventor Gerhard Menzel
  Braunschweig, Germany
[21] Appl. No. 880,586
[22] Filed Nov. 28, 1969
[45] Patented Dec. 14, 1971
[73] Assignee Propper Manufacturing Company Inc.
  Long Island City, N.Y.

[54] APPARATUS FOR GRINDING THE CORNERS OF FLAT GLASS PLATES SUCH AS GLASS SLIDES
4 Claims, 2 Drawing Figs.

[52] U.S. Cl. ................................................ 51/125
[51] Int. Cl. ................................................ B24b 9/08
[50] Field of Search ........................................ 51/125, 128, 211, 216

[56] References Cited
UNITED STATES PATENTS
2,578,789  12/1951  Donnelly .................... 51/128 UX
FOREIGN PATENTS
529,299  9/1921  France ........................ 51/125

Primary Examiner—Harold D. Whitehead
Attorney—Blum, Moscovitz, Friedman & Kaplan ABSTRACT: An apparatus for grinding or rounding the corners of flat glass plates such as glass slides. The apparatus includes a rotary grinding wheel having a grinding surface over which an elongated, bottomless trough is located. This trough has a pair of opposed sidewalls oppositely inclined toward each other in a downward direction to provide the trough with the cross section of a funnel, and groups of the slides which are to be treated are supported by the opposed walls of the trough in the latter with lower end regions of the slides extending through the open bottom of the trough into engagement with the grinding surface of the grinding wheel. A positioning rod extends parallel to the opposed walls of the trough along the center line of the open bottom thereof to engage and support the slides at their lower edges while their corners are rounded by engagement with the grinding surface of the grinding wheel.

Patented Dec. 14, 1971 3,626,842

INVENTOR.
GERHARD MENZEL

ATTORNEYS

3,626,842

APPARATUS FOR GRINDING THE CORNERS OF FLAT GLASS PLATES SUCH AS GLASS SLIDES

BACKGROUND OF THE INVENTION

The present invention relates to flat glass articles such as, for example, glass slides intended to carry specimens which are to be observed under a microscope.

It is often desirable to provide such glass articles with corners which are ground or rounded. At the present time in order to provide articles with such construction it is necessary to make use of relatively complex machinery and expensive methods, so that in order to obtain the slides with rounded or ground corners an undesirably high cost is encountered.

SUMMARY OF THE INVENTION

It is accordingly a primary object of the present invention to provide an apparatus which will reliably grind the corners of slides while maintaining the cost low.

In particular, it is an object of the invention to provide a construction which can round off or otherwise grind the corners of a relatively large number of glass slides simultaneously while making use of a relatively simple structure which is very reliable in operation.

In addition, it is an object of the invention to provide a construction of this type which can be adjusted to control the rounding or grinding the corners of the slides.

According to the invention there is situated over the upper grinding surface of the rotary grinding wheel an elongated, bottomless trough having oppositely inclined opposed sidewalls which approach each other in a downward direction and which give the trough in cross section the configuration of a funnel. A positioning means extends along the open bottom of the trough parallel to the sidewalls thereof at the centerline of the open bottom to engage groups of slides and support them at their lower edges while their corners extend through the open bottom of the trough into engagement with the grinding surface of the grinding wheel. In order to control the extent of grinding the positioning means, which takes the form of an elongated rod, can be adjusted in elevation, together with the trough, if desired. Moreover, in order to protect the glass slides it is preferred to provide a positioning means in the form of an elongated rotatable rod covered at its exterior by a layer of a soft elastic material. Further adjustments of the operation of the grinding can be carried out by providing for the trough a structure which enables the trough to be adjusted radially with respect to the axis of the grinding wheel.

BRIEF DESCRIPTION OF DRAWINGS

The invention is illustrated by way of example in the accompanying drawings in which.

DESCRIPTION OF PREFERRED EMBODIMENTS

Figure 1:
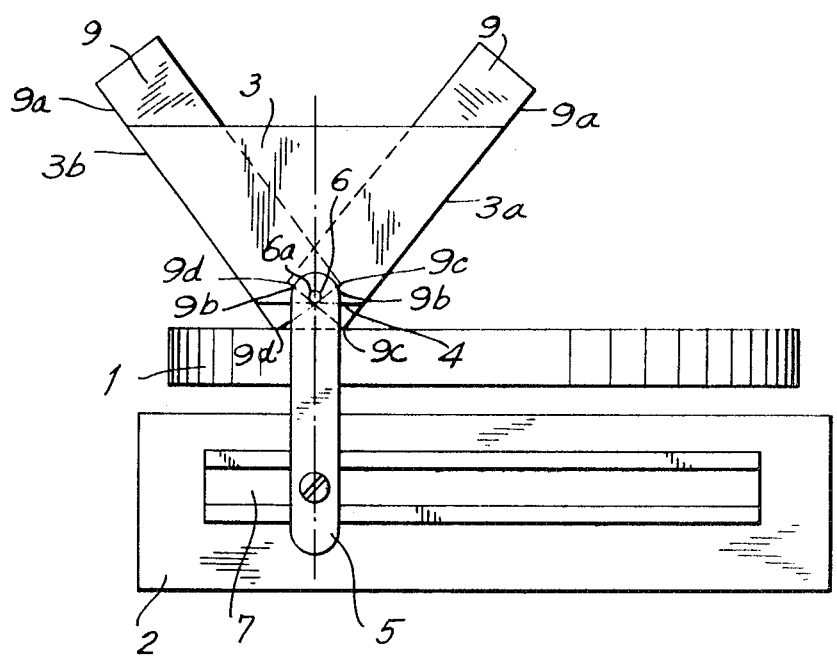
FIG. 1 is a schematic side elevation of a structure according to the invention.
Figure 2:
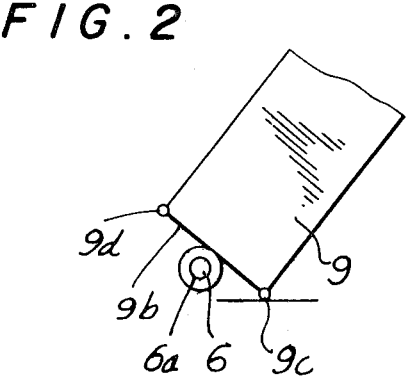
FIG. 2 is a fragmentary schematic illustration of the manner in which a slide is supported during grinding of a corner thereof.

Referring now to FIG. 1, the structure of the invention is shown therein as including the schematically illustrated rotary grinding wheel 1 which is positioned horizontally and has a vertical, central axis of rotation, this grinding wheel 1 having an upper grinding surface, as viewed in FIG. 1. A substantially rectangular machine housing 2 carries in its interior an unillustrated driving motor which can be stopped and started in any well-known manner and which has a drive shaft extending centrally up through the grinding wheel 1 and fixed thereto so that the latter is rotated when the motor operates.

According to the invention there is located over the grinding wheel 1 an elongated trough 3 which is provided with an open bottom. A pair of opposed vertical bars 5 carrying the opposed ends of a rod 6 which forms a positioning means of the invention, these opposed ends being supported for free rotary movement at the upper ends of the bars 5. The bars 5 together with the opposed ends of the positioning means 6 extends partly into the trough 3 at the end walls of the latter with the positioning means formed by the rotary rod 6 extending along the centerline of the open bottom 4 of the trough parallel to the oppositely inclined opposed sidewalls 3a and 3b of the trough 3. These oppositely inclined sidewalls 3a and 3b gradually approach each other in a downward direction and provide the trough 3 with the cross section of a funnel, as is apparent from FIG. 1. Any suitable unillustrated frame structure supports the trough 3 at the elevation illustrated in FIG. 1 with the respect to the grinding wheel 1. It is preferred to provide the substantially rigid rod 6 with an outer coating 6a of a layer of a soft elastic material such as, for example, foam rubber. The bars 5 are respectively carried by horizontal bars on guides 7 which are fixed to the housing 1, so that the rods 5 together with the positioning means 6 can be laterally adjusted. In addition the rods 5 may be fixed to the bars 7 at exterior side surfaces thereof by way of screws which extend through unillustrated vertically extending slots of the bars 5 so that in this way the elevation of the positioning means 6 can be regulated. If desired the ends of the rod 6 can be received in openings of the end walls of trough 3 and the latter can be guided through suitable vertical elements for free vertical movement so that when the rod 6 is adjusted in elevation the trough 3 will also be adjusted in elevation therewith, and in this way the relative positions of the trough 3 and positioning means 6 will not be disturbed during elevation adjustments.

The flat glass articles such as the specimen-carrying slides 9, the corners of which are to be ground or rounded, are situated in groups within the trough 3 in the manner illustrated where the groups are arranged in series alternately engaging the opposed sidewalls 3a and 3b. Thus, one of the longitudinal side edges 9a of each slide 9 engages the wall 3a of the trough 3, and corresponding edges of the opposed groups of slides 9 engage the wall 3b. The bottom edge 9b of each slide rests on the positioning means 6 and is protected thereby, particularly where an elastic coating surrounds the rotary positioning rod 6. This rod 6 is of course adjusted in elevation by way of the bars 5. The elevation to which the positioning means 6 is adjusted will determine, during rotary movement of the grinding wheel 1, the required depth of grinding and thus the desired extent to which the first corner 9c at the end of the edge 9b is ground. Until the desired extent of grinding has been achieved, the groups of glass slides advance under their own weight continuously in a fully automatic manner downwardly along the opposed sidewalls 3a and 3b through the open bottom 4 of the trough. Thus, when the sharp corners 9c initially engage the grinding surface the slides 9 may be situated at the bottom edges 9b somewhat above the positioning means 6, but as they advance downward during grinding away of the lower corners they gradually approach the positioning means 6 which limits the extent of grinding. If desired the downward movement of the slides to grind away the corners thereof can be additionally brought about by additional weights which are applied to the top ends of the slides or by a spring assembly which urges the slides downwardly.

After one corner is ground it is only necessary to remove each group of slides upwardly away from the positioning means 6 and to reverse the positions of the slides either end-for-end around a central horizontal axis extending through the slides or around an axis extending parallel to and situated midway between the opposed longitudinal side edges of each slide, so that in this way the four corners of each slide can be successively brought into engagement with the grinding surface of the wheel 1. The freedom of the positioning means 6 to rotate renders the repositioning of the slides exceedingly convenient to carry out. Thus, for example, after the corner 9c of each slide is ground, the slides may be positioned so that their corners 9d will be ground, and then the packet or group of slides can be reversed end-for-end so that the corners shown at the upper ends of the slides in FIG. 1 can then be ground.

In accordance with the length of the trough 3 and the number of groups of slides 9 situated therein it is possible to adjust the trough 3 radially together with the bars 5 and the positioning means 6, with respect to the axis of the grinding wheel 1, so that the greatest possible number of slides can be simultaneously ground at their corners. Moreover in accordance with the requirements of the particular grinding operations, such as the desired grinding intensity and/or length of the trough 3, it is possible by lateral movement of the bars 5 along the guide 7 to adjust the work so that it will be located in engagement with a rotary grinding zone which moves either at a relatively rapid speed or a relatively slow speed in accordance with the desired results of a particular operation.

I claim:

1. In an apparatus for grinding the corners of flat glass plates such as slides for carrying specimens to be observed under microscope, a rotary grinding wheel having a substantially horizontal grinding surface, an elongated bottomless trough extending over said grinding surface of said wheel and having opposed oppositely inclined sidewalls providing the trough with a cross section of funnel-shaped configuration, so that groups of said plates which are to be ground at their corners may be situated in the trough in engagement with the opposed sidewalls thereof extending through the open bottom of the trough with the corners of said plates in engagement with the grinding surface of the grinding wheel, and elongated positioning means extending between said opposed sidewalls walls of said trough parallel to said sidewalls at the region of the open bottom for supporting lower edges of the glass plates.

2. The combination of claim 1 and wherein an adjusting means coacts with said positioning means for adjusting the elevation thereof.

3. The combination of claim 1 and wherein said positioning means is in the form of an elongated rod which is rotatable and which is covered with a layer of soft elastic material.

4. The combination of claim 1 and wherein an adjusting means is operatively connected with said trough for adjusting the position of said trough radially with respect to said grinding wheel.

* * * * *